United States Patent

Ishida et al.

[11] Patent Number: 5,895,860
[45] Date of Patent: Apr. 20, 1999

[54] HEAT EXCHANGING MEDIUM PRESSURE MEASURING APPARATUS

[75] Inventors: Hideki Ishida; Takeo Shimizu, both of Konan, Japan

[73] Assignee: Zexel Corporation, Tokyo, Japan

[21] Appl. No.: 08/955,522

[22] Filed: Oct. 22, 1997

[30] Foreign Application Priority Data

Oct. 25, 1996 [JP] Japan ................... 8-301299

[51] Int. Cl.$^6$ .................. G01L 13/00; G01F 1/34
[52] U.S. Cl. .................. 73/714; 73/756; 73/861.42
[58] Field of Search .................. 73/717, 714, 716, 73/756, 861.61, 861.52, 861.42

[56] References Cited

U.S. PATENT DOCUMENTS 5,156,012  10/1992  Kuribara et al. .................. 73/19.01 X
5,672,832  9/1997  Cucci et al. .................. 73/706 X Primary Examiner—George Dombroske
Assistant Examiner—Abdullahi Aw-Musse
Attorney, Agent, or Firm—Wenderoth, Lind & Ponack, L.L.P.

[57] ABSTRACT

A cylindrical member of a sensor mounting member is partitioned in its middle by a partitioning wall into a high pressure side and a low pressure side, with pressure sensors provided at the two surfaces of the partitioning wall. At a base portion of the sensor mounting member, a communicating hole constituting a portion of a flow passage of a piping joint connector is formed. The sensor mounting member structured as described above is fitted in a communicating hole that communicates between a high pressure passage and a low pressure passage bored at the side of the piping joint connector. With this, the pressure sensor for measuring the pressure of the heat exchanging medium at high pressure and the pressure sensor for measuring the pressure of the heat exchanging medium at low pressure can be mounted in an integrated manner, thereby achieving a reduction in the number of parts such as mounting parts for mounting the pressure sensors and a reduction in the number of mounting processes to simplify the production work.

16 Claims, 4 Drawing Sheets

HEAT EXCHANGING MEDIUM PRESSURE MEASURING APPARATUS

BACKGROUND OF THE INVENTION

1. Field of the Invention

The present invention relates to a structure for mounting pressure sensors which measure the pressure of a heat exchanging medium at high pressure and a heat exchanging medium at low pressure flowing in the cooling cycle in an air conditioning system for vehicles and the like, at an expansion valve or a piping joint connector of the air conditioning system.

2. Description of the Related Art

In recent years, the heightened global awareness of environmental issues and the need to conserve energy resources have prompted the automotive industry to strive for reductions in fuel consumption in automobiles. As one of the methods for responding to the demand for reduced fuel consumption in automobiles, the engine load resulting from driving the air conditioning system in the automobile may be reduced by lowering the idling rotation rate of the engine.

However, in order to lower the idling rotation rate, the rotation rate of the engine must be controlled finely in correspondence to changes in the pressure of the heat exchanging medium by measuring the pressure of the heat exchanging medium flowing in the low pressure passage as well as the pressure of the heat exchanging medium flowing in the high pressure passage in the cooling cycle of the air conditioning system.

For this purpose, a method whereby a high pressure side sensor and a low pressure side sensor are separately installed at a connecting passage at the high pressure side and a connecting passage at the low pressure side respectively to measure the pressures of the fluid body (heat exchanging medium) flowing inside the connecting passages and at the high pressure side and at the low pressure side, is disclosed in, for instance, Japanese Unexamined Patent Publication No. S63-101712, is adopted.

However, if pressure sensors are separately installed in the individual connecting passages as disclosed in Japanese Unexamined Patent Publication No. S63-101712 mentioned above, problems arise in that the number of parts must be increased, since mounting portions for installing the individual pressure sensors are required and in that the number of manufacturing steps must increase as well, since the individual pressure sensors must be mounted separately.

SUMMARY OF THE INVENTION

Accordingly, the object of the present invention is to provide a heat exchanging medium pressure measuring apparatus with which a reduction in the number of parts such as the mounting parts for mounting the pressure sensors and a reduction in the mounting steps are achieved by integrating the pressure sensors for measuring the heat exchanging medium at high pressure and the heat exchanging medium at low pressure.

Thus, the heat exchanging medium pressure measuring apparatus according to the present invention, is provided with a pressure sensor for measuring the pressure of a heat exchanging medium at high pressure flowing from a condenser to an expansion valve and a pressure sensor for measuring the pressure of a heat exchanging medium at low pressure flowing from an evaporator to a compressor in the cooling cycle constituted by sequentially connecting through piping at least, the compressor, the condenser, the expansion valve and the evaporator. In the heat exchanging medium pressure measuring apparatus, a sensor mounting block having a high pressure passage through which the heat exchanging medium flows at high pressure and a low pressure passage through which the heat exchanging medium flows at low pressure is provided, with a communicating passage formed extending from the high pressure passage to the low pressure passage in the sensor mounting block. A partitioning wall partitions the communicating passage into a high pressure passage side and a low pressure passage side, and the individual pressure sensors installed at the high pressure passage side and the low pressure passage side are separated by the partitioning wall.

With this structure, since the communicating passage in the sensor mounting block, which is partitioned by the partitioning wall, only communicates with either the high pressure passage or the low pressure passage, the heat exchanging medium at high pressure flowing into the high pressure passage of the sensor mounting block from the condenser side advances to the side of the communicating passage where it communicates with the high pressure passage so that the pressure is measured by the pressure sensor provided at the high pressure passage side of the partitioning wall and the heat exchanging medium at low pressure flowing into the low pressure passage of the sensor mounting block from the evaporator side advances to the side of the communicating passage where it communicates with the low pressure passage so that the pressure is measured by the pressure sensor provided at the low pressure passage side of the partitioning wall.

It is to be noted that the heat exchanging medium pressure measuring apparatus according to the present invention may be achieved by boring an opening in the communicating passage to communicate between the high pressure passage and the low pressure passage from a side of the block, by mounting a sensor mounting member provided with a cylindrical portion which is fitted in the bored opening in the communicating passage to open into the high pressure passage and the low pressure passage with a partitioning wall partitioning it in the middle and a base portion that blocks off the opening portion formed at the side wall of the block and is provided with a communicating hole to constitute a portion of the flow passage and by providing the pressure sensors at both surfaces of the partitioning wall provided at the cylindrical portion.

With this, since the cylindrical portion of the sensor mounting member communicates with the high pressure passage of the sensor mounting block at one side and communicates with the low pressure passage of the sensor mounting block at the other side with the partitioning wall partitioning it in the middle having the pressure sensors provided at both surfaces thereof, the heat exchanging medium at high pressure having flowed into the high pressure passage of the sensor mounting block from the condenser side reaches the partitioning wall at the cylindrical portion of the sensor mounting member so that its pressure is measured by the pressure sensor provided at the surface of the partitioning wall, and the heat exchanging medium at low pressure having flowed into the low pressure passage of the sensor mounting block from the evaporator side reaches the partitioning wall of the cylindrical portion of the sensor mounting member so that its pressure is measured by the pressure sensor provided at the surface of the partitioning wall.

In addition, since the pressure sensor for measuring the pressure of the heat exchanging medium at high pressure and the pressure sensor for measuring the pressure of the heat exchanging medium at low pressure are provided at the cylindrical portion of the sensor mounting member, only the mounting member for mounting the sensor mounting member is required, unlike a structure in which two pressure sensors are separately mounted.

Moreover, since the pressure sensor for measuring the pressure of the heat exchanging medium at high pressure and the pressure sensor for measuring the pressure of the heat exchanging medium at low pressure are provided at the cylindrical portion of the pressure sensor mounting member, the pressure sensors can be mounted in one operation simply by fitting the sensor mounting member to the sensor mounting block.

Alternatively, the sensor mounting block constituting the heat exchanging medium pressure measuring apparatus according to the present invention may be constituted of a separate block provided between the condenser and the expansion valve and connected to the expansion valve.

Furthermore, the block of the expansion valve constituting the heat exchanging medium pressure measuring apparatus according to the present invention, in which a high pressure passage through which the heat exchanging medium at high pressure flows and a low pressure passage through which the heat exchanging medium at low pressure flows are formed, may also function as the sensor mounting block.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

The following is an explanation of an embodiment of the present invention in reference to the drawings.

The heat exchanging medium pressure measuring apparatus in this embodiment of the present invention comprises a piping joint connector 1 and a sensor mounting member 2 mounted at the piping joint connector 1.

Figure 1:
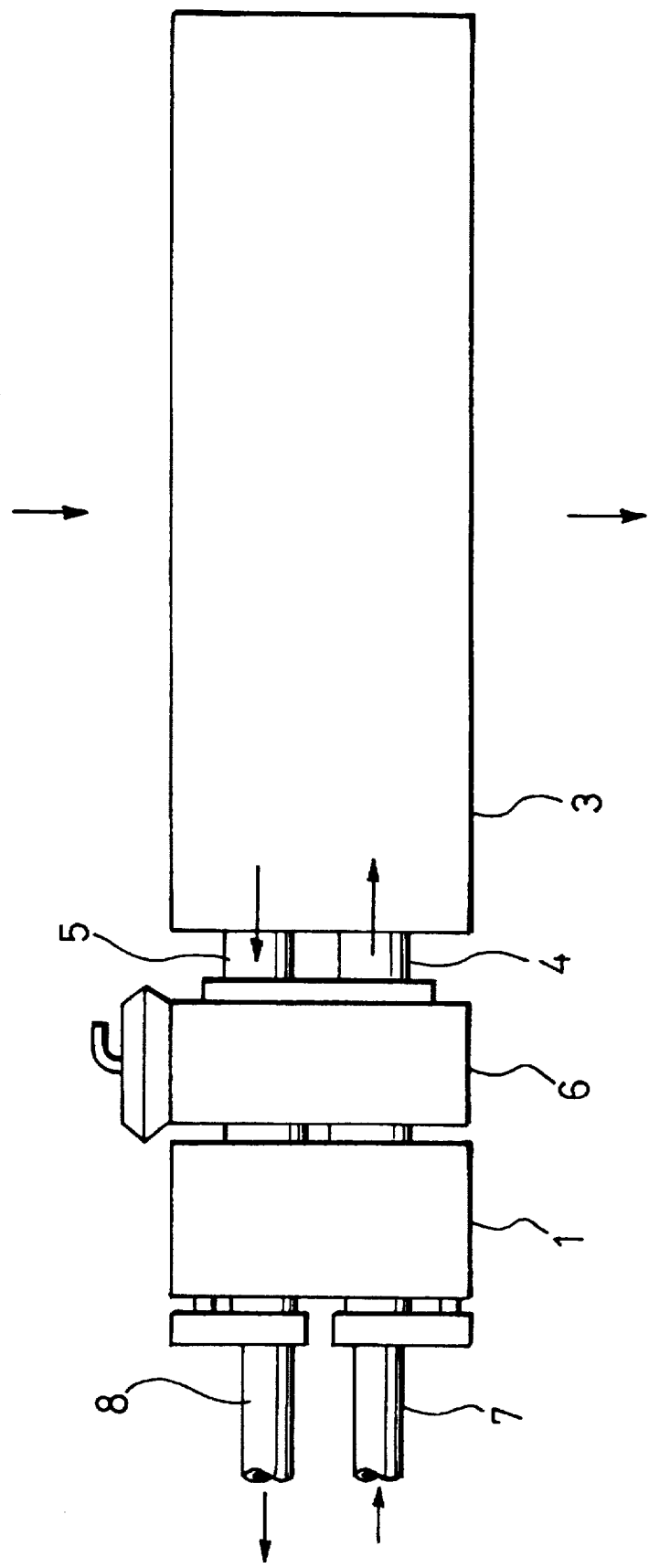
FIG. 1 illustrates a piping joint connector in one embodiment connected with the expansion valve and an evaporator.
Figure 2:
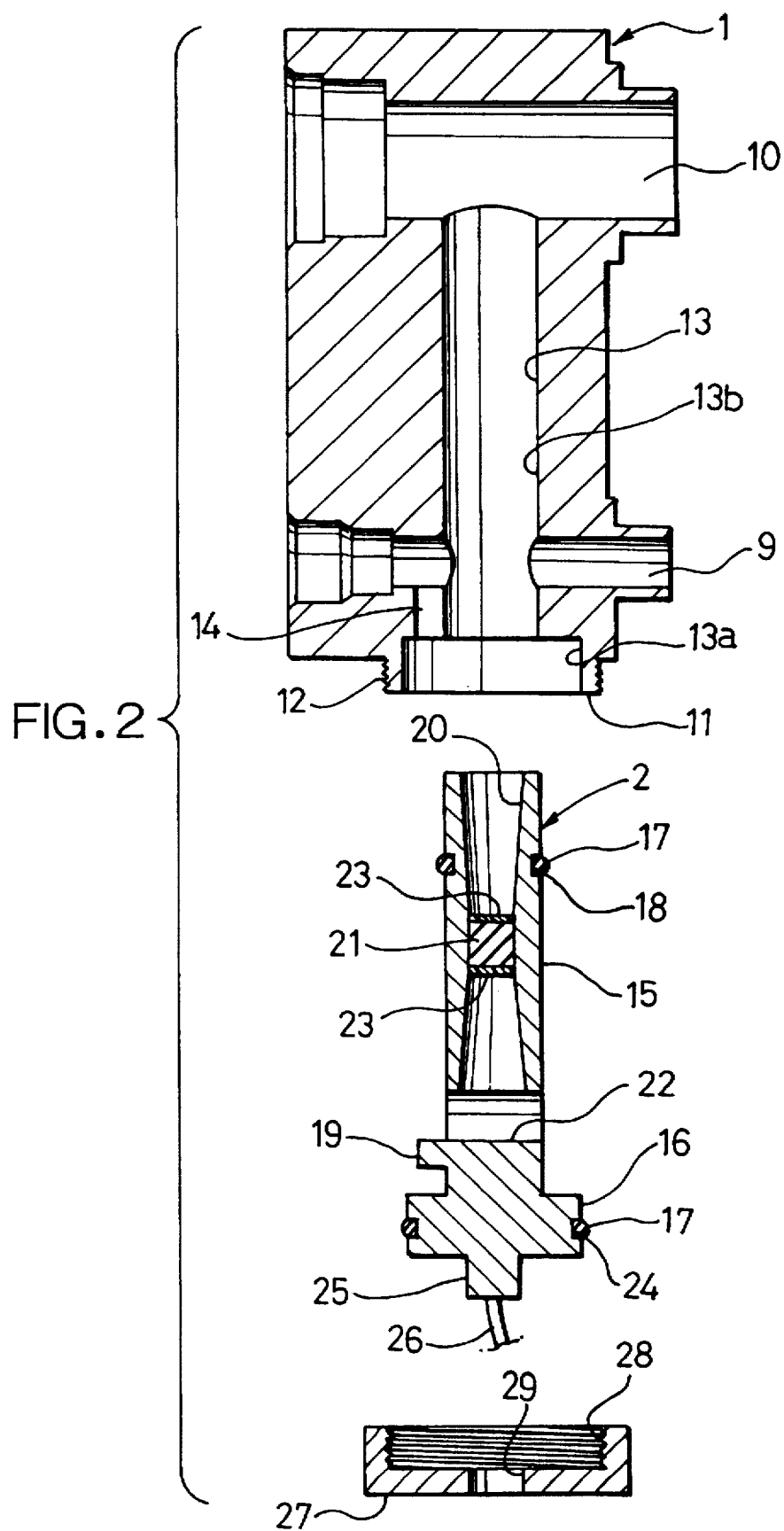
FIG. 2 is a cross section showing structures of the piping joint connector in FIG. 1 and of a sensor mounting member which is mounted thereupon.

Of these, the piping joint connector 1 can be referred to generically as a ; sensor mounting block and as shown in FIG. 1, it is provided to join a piping 7 from a condenser and a piping 8 to a compressor to a block type expansion valve 6 which is connected to an intake portion 4 and an outlet portion 5 of an evaporator 3.

This piping joint connector (hereafter referred to as connector) 1 is provided with a high pressure passage 9 that communicates between the piping 7 from the condenser and the constricted side of the expansion valve 6 to let a heat exchanging medium at high pressure and high temperature pass through it, and a low pressure passage 10, which lets a heat exchanging medium at low pressure and low temperature that has been vaporized at the evaporator 3 pass through it.

In addition, although not shown to avoid complicating the drawings, the connector 1 is provided with a threaded piping mounting hole for securing the piping 7 to the connector 1, a threaded piping mounting hole for securing the piping 8 to the connector 1 and a through hole for connecting the connector 1 to the expansion valve 6.

Moreover, the connector 1 is provided with a projecting portion 11 which projects out in a roughly cylindrical shape at its side with a thread 12 formed at the circumferential surface of the projecting portion 11 so that a nut 27, which is to be detailed later, can be externally fitted. In addition, at a side of the connector 1, a communicating hole 13 that extends from the apex of the projecting portion 11 to the low pressure passage 10 by crossing the high pressure passage 9 is provided. This communicating hole 13 is constituted of a large diameter portion 13a located in the vicinity of the opening end and a small diameter portion 13b extending from the upper end of the large diameter portion 13a to the low pressure passage 10. A slit 14 is formed extending from the large diameter portion 13a to the high pressure passage 9 where a retaining portion 19 of the sensor mounting member 2, which is to be detailed later, can be connected.

The sensor mounting member 2 basically comprises a cylindrical portion 15 and a base portion 16, formed continuously to the cylindrical portion 15, having external diameters and dimensions in the axial direction that allow them to be mounted at the small diameter portion 13b and the large diameter portion 13a, respectively, of the connector 1.

The cylindrical portion 15 is provided with a circular groove 18 at its external circumferential surface where an o-ring 17 can be fitted so that when it is mounted at the small diameter portion 13b of the communicating hole 13, it can be placed in close contact with the internal wall of the small diameter portion 13b. The retaining portion 19, is inserted and fitted in the slit 14 of the small diameter portion 13b so that a side thereof may be placed in contact with a side portion of the high pressure passage 9.

The cylindrical portion 15 is also provided with a communicating passage 20 having an opening end that communicates with the low pressure passage 10 of the connector 1 and an opening end that communicates with a communicating hole 22 of the base portion 16, which is to be described below when one end of the cylindrical portion 15 is mounted at the connector 1, the communicating passage 20 is partitioned at the center by a partitioning wall 21. It is to be noted that the cylindrical portion 15 may be formed so that its internal diameter becomes gradually reduced from the two opening ends toward the partitioning wall 21.

Figure 4:
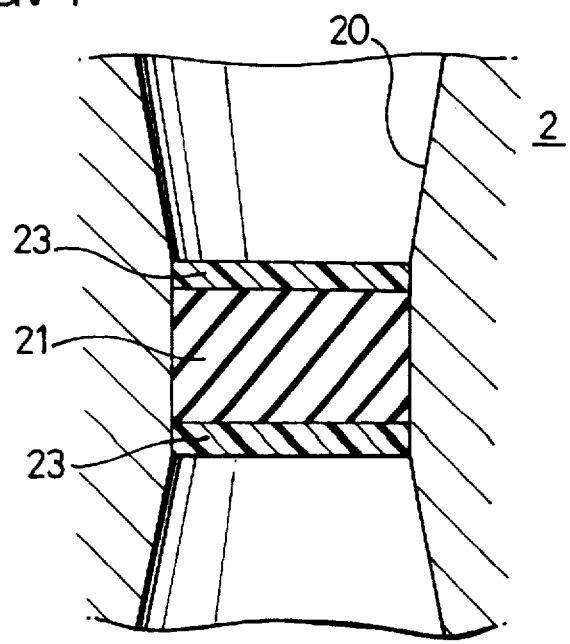
FIG. 4 is an enlargement of an essential portion of the piping joint connector with pressure sensors provided at both sides of a partitioning wall at its cylindrical portion.

As shown in FIG. 4, a pressure sensor 23 is provided at each side surface of the partitioning wall 21 facing the communicating passage 20 . Pressure sensors in the known art such as electrical capacitance pressure sensors, diffused metal oxide semiconductor pressure sensors or the like may be employed to constitute these pressure sensors 23 to enable them to output pressure signals to a control apparatus (not shown).

In addition, the partitioning wall 21 partitioning the communicating passage 20 is constituted of an insulating material to ensure that the two pressure sensors 23 and 23 are electrically isolated and, because of this, the partitioning wall 21 partitioning the communicating passage 20 may be formed by fitting an insulating member into the communicating passage 20 of the cylindrical portion 15 of the sensor mounting member 2.

The base portion 16 is provided with a circular groove 24 mounted with an o-ring 17 at its external circumferential surface so that when it is mounted at the large diameter portion 13a of the communicating hole 13, it can be placed in close contact with the internal wall of the large diameter portion 13a. The base portion 16 is also provided with a lead line outlet portion 25 at its rear end so that a lead line 26 for communicating pressure signals from the pressure sensors 23 and 23 to the control apparatus can be led out via the lead line outlet portion 25.

The sensor mounting member 2 is secured to the connector 1 with the nut 27 which is formed in a roughly bottle-cap shape constituted of a bottom portion and a side wall which is provided standing erect at the circumferential edge of the bottom portion. A thread 28 of the nut 27 interlocks with the thread 12 of the projecting portion 11 of the connector 1 formed at its internal circumferential side surface. Hole 29, in which the lead line outlet portion 25 of the sensor mounting member 2 is inserted, is formed at the bottom portion of the nut 27

Thus, employing the connector 1, the sensor mounting member 2 and the nut 27 structured as described above, the sensor mounting member 2 is mounted at the connector 1 securely with an air tight seal between the small diameter portion 13b and the cylindrical portion 15 and an air tight seal between the large diameter portion 13a and the base portion 16 achieved by the o-ring 17 simply by first inserting the sensor mounting member 2 into the connector 1 with the retaining portion 19 aligned at the slit 14, then inserting the lead line 26 drawn out from the sensor mounting member 2 in the hole 29 of the nut 27 and interlocking the nut 27 with the projecting portion 11 of the connector 1.

Consequently, in this structure, the pressure sensors are provided in an integrated manner at one sensor mounting member 2, unlike in a structure in which the pressure sensor 23 for measuring the heat exchanging medium at high pressure and the pressure sensor 23 for measuring the heat exchanging medium at low pressure are mounted at separate positions, thereby integrating the mounting members and the like to realize a reduction in the number of parts. In addition, unlike a structure in which the pressure sensor for measuring the heat exchanging medium at high pressure and the pressure sensor for measuring the heat exchanging medium at low pressure are installed separately, the pressure sensors can be mounted through a single installation step, which achieves a reduction in the number of work processes. Furthermore, since the sensor mounting member 2 can be mounted by inserting the retaining portion 19 in the slit 14, positioning is facilitated. Moreover, the sensor mounting member 2 can be prevented by the retaining portion 19 from rotating together with the nut 27 when the nut 27 is turned.

Figure 3:
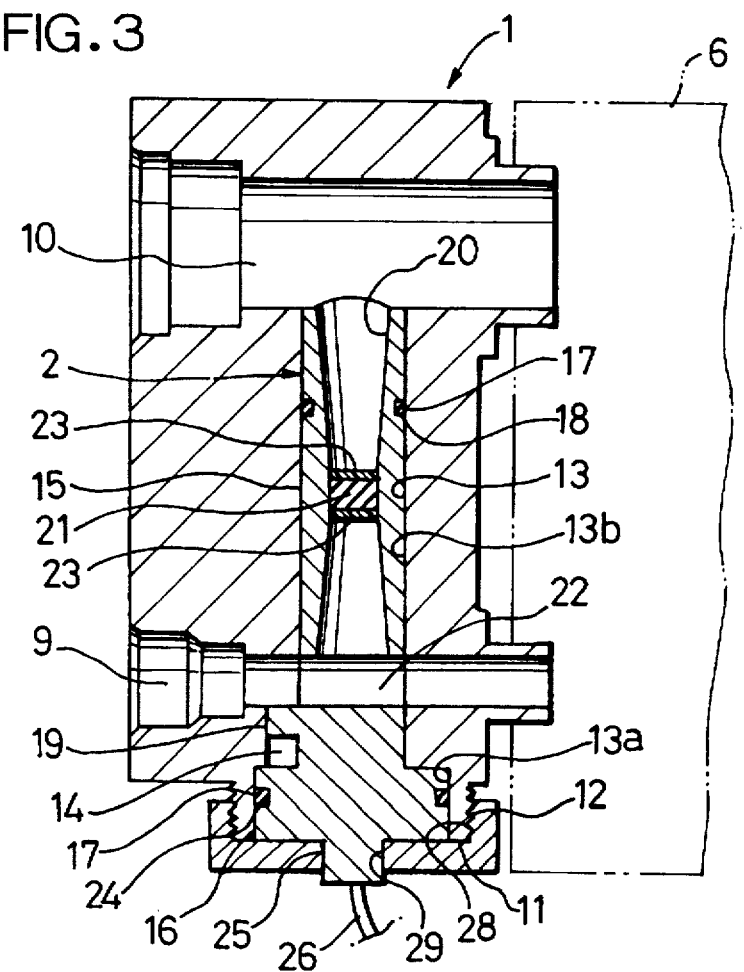
FIG. 3 is a cross section showing the sensor mounting member mounted to the piping joint connector above.

As shown in FIG. 3, the heat exchanging medium at high pressure having flowed into the high pressure passage 9 of the connector 1 from the condenser, advances to the side of the communicating passage 20 partitioned by the partitioning wall 21 that communicates with the high pressure passage 9 through the communicating hole 22 of the sensor mounting member 2 so that the pressure sensor 23 provided at the surface of the partitioning wall 21 of the communicating passage 20 can measure the pressure of the heat exchanging medium, and the heat exchanging medium at low pressure having flowed into the low pressure passage 10 of the connector 1 from the evaporator 2 advances to the side of the communicating passage 20 partitioned by the partitioning wall 21 that communicates with the low pressure passage 10 so that the pressure sensor 23 provided at the surface of the partitioning wall 21 of the communicating passage 20 can measure the pressure of the heat exchanging medium. Thus, by ensuring that the pressures of the heat exchanging medium flowing into the two sides of the communicating passage 20 are measured at the same time, it is possible to finely control the rotation rate of the engine in correspondence to changes in the pressure of the heat exchanging medium.

Furthermore, since the connector 1 can be employed equally well in various forms of evaporators 3, the heat exchanging medium pressure measuring apparatus according to the present invention may be employed in any type of vehicle simply by forming the communicating hole 13 in the connector 1 and inserting the sensor mounting member 2 in the communicating hole 13.

It is to be noted that, while, in reference to the embodiment described above, the explanation is given of a structure in which the communicating hole 13 is formed so that it opens at the high pressure passage 9 of the connector 1 and reaches the low pressure passage 10 by extending across the high pressure passage 9, the present invention is not limited to this structure. Although not shown, the communicating hole 13 may be formed so that it opens at the low pressure passage 10 of the connector 1 and reaches the high pressure passage 9 by extending laterally across the low pressure passage 10. However, in that case, it is necessary to ensure that the communicating hole 20 of the sensor mounting member 2, which is mounted at the communicating hole 13, can communicate with the high pressure passage 9.

Figure 5:
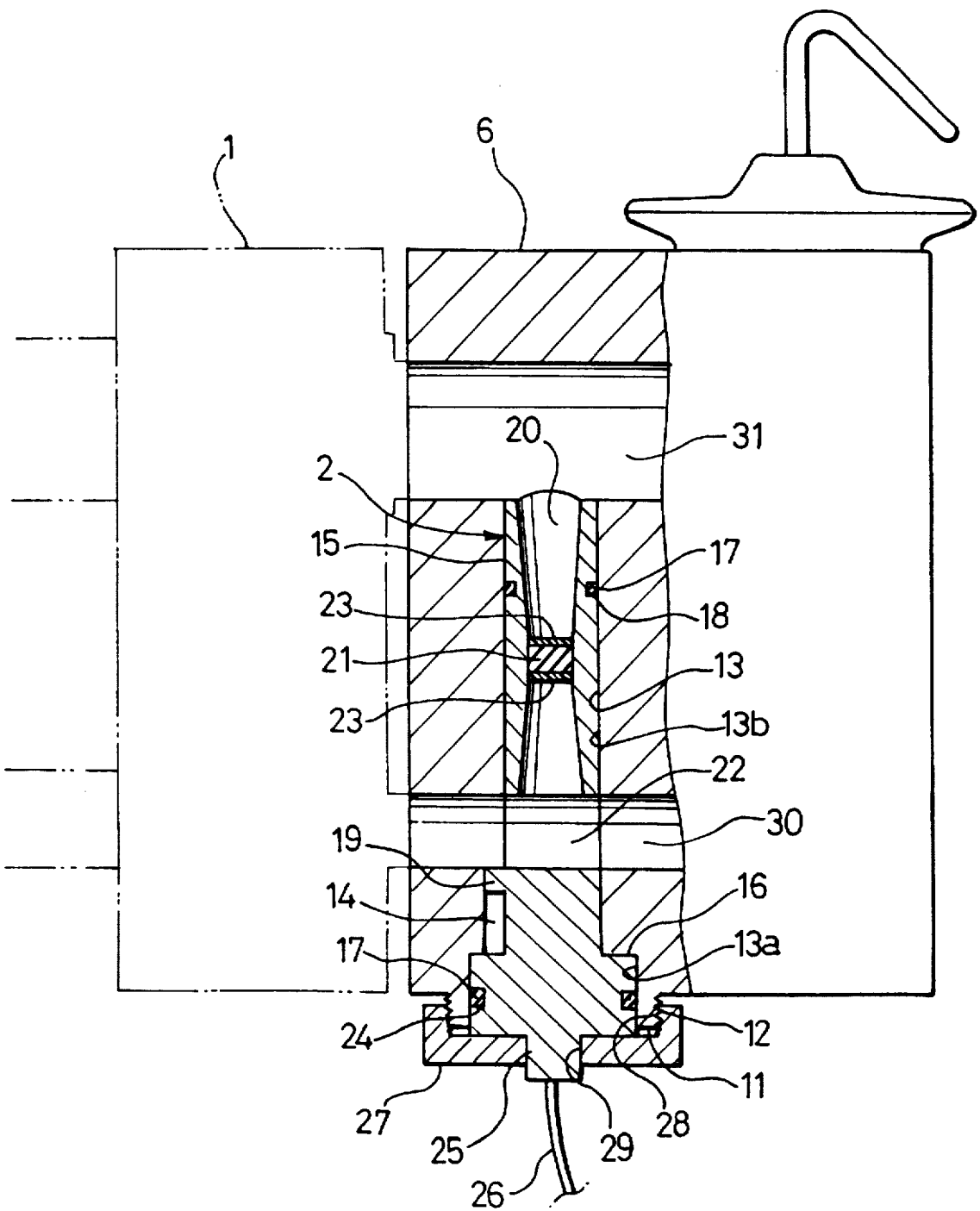
FIG. 5 is a cross section of another embodiment illustrating the sensor mounting member mounted at a communicating hole provided at the expansion valve.

Furthermore, while the explanation has been given of a heat exchanging medium pressure measuring apparatus that is employed with the connector 1, it may not be employed with the connector 1 and may instead be employed with the expansion valve 6. Namely, as shown in FIG. 5, a communicating hole 13, which opens at the side of the expansion valve 6 in the vicinity of a high pressure passage 30 into which the heat exchanging medium at high pressure flows and reaches a low pressure passage 31 by extending laterally across the high pressure passage 30 may be formed so that by mounting the sensor mounting member 2 at this communicating hole 13, a reduction in the number of parts and a reduction in the number of work processes can be achieved, as in the case in which the sensor mounting member 2 is mounted at the connector 1. It is to be noted that the structures of the communicating hole 13 and the vicinity of its opening portion and the structure of the sensor mounting member 2 are identical to those that have been explained previously, the same reference numbers are assigned and their explanation is omitted. In addition, since the expansion valve 6 also has structural features of the known art except that it is provided with the communicating hole 13, its explanation is omitted.

As has been explained, according to the present invention, since the pressure sensor for measuring the pressure of the heat exchanging medium at high pressure and the pressure sensor for measuring the pressure of the heat exchanging medium at low pressure are provided at the sensor mounting member, only the mounting part for mounting the sensor mounting member is required, thereby achieving a reduction in the number of mounting members required compared with a case in which the pressure sensors are separately installed, to keep down the production cost.

In addition, according to the present invention, since the pressure sensor for measuring the pressure of the heat exchanging medium at high pressure and the pressure sensor for measuring the pressure of the heat exchanging medium at low pressure can be mounted at once by mounting the sensor mounting member at a member constituting the cooling cycle, the number of required work processes is reduced, thereby simplifying the installation of the pressure sensors.

What is claimed is:

1. A heat exchanging medium pressure measuring apparatus comprising:

a sensor mounting block, constituting a part of an expansion valve, having a high pressure passage through which a heat exchanging medium at high pressure flows, a low pressure passage through which a heat exchanging medium at low pressure flows and a communicating passage communicating between said high pressure passage and said low pressure passage;

a partitioning wall provided at said communicating passage to partition said communicating passage into a high pressure side and a low pressure side; and a pair of pressure sensors provided at both sides of said partitioning wall and including a first pressure sensor provided at said high pressure side of said communicating passage to measure pressure of said heat exchanging medium at high pressure, and a second pressure sensor provided at said low pressure side of said communicating passage to measure pressure of said heat exchanging medium at low pressure.

2. A heat exchanging medium pressure measuring apparatus according to claim 1, wherein:

one side of said high pressure passage of said sensor mounting block communicates with high pressure passage of a piping joint connector and another side of said high pressure passage of said sensor mounting block is constituted as an integrated part of a high pressure passage of said expansion valve.

3. A heat exchanging medium pressure measuring apparatus according to claim 2, wherein:

one side of said low pressure passage of said sensor mounting block communicates with a low pressure passage of a piping joint connector and another side of said low pressure passage of said sensor mounting block is constituted as an integrated part of a low pressure passage of said expansion valve.

4. A heat exchanging medium pressure measuring apparatus according to claim 3, wherein:

said partitioning wall is constituted of an electrical insulator to electrically isolate said first pressure sensor from said second pressure sensor.

5. A heat exchanging medium pressure measuring apparatus according to claim 4, wherein:

said sensor mounting block is provided with a communicating hole communicating between said high pressure passage of said sensor mounting block and said low pressure passage of said sensor mounting block, with one side of said communicating hole opening at a side surface of said sensor mounting block.

6. A heat exchanging medium pressure measuring apparatus according to claim 5, wherein:

said communicating passage is formed by fitting a sensor mounting member in said communicating hole through an opening formed at said side surface of said sensor mounting block.

7. A heat exchanging medium pressure measuring apparatus according to claim 6, wherein:

said sensor mounting member is provided with a cylindrical portion opening at said high pressure passage of said sensor mounting block and said low pressure passage of said sensor mounting block and being centrally partitioned by said partitioning wall, with said pressure sensors provided at two surfaces of said partitioning wall, and a base portion closing said communicating passage opening at said side surface of said sensor mounting block and being provided with a communicating hole constituting a portion of said high pressure passage and said low pressure passage.

8. A heat exchanging medium pressure measuring apparatus according to claim 7, wherein:

said sensor mounting block is further provided with a roughly cylindrical projecting portion projecting out from a circumferential edge of said opening with a thread formed at an external side surface thereof.

9. A heat exchanging medium pressure measuring apparatus according to claim 8, further comprising:

a nut comprising a bottom portion having a fitting hole in which a portion of said sensor mounting member is fitted and a side wall standing erect at a circumferential edge of said bottom portion, wherein a screw groove is formed at an internal side surface of said side wall and interlocks with said thread of said projecting portion.

10. A heat exchanging medium pressure measuring apparatus according to claim 9, wherein:

said communicating hole is constituted of a large diameter portion located near an opening end thereof and a small diameter portion extending from an upper end of said large diameter portion to said low pressure passage of said sensor mounting block, with a slit formed extending from said large diameter portion to said high pressure passage.

11. A heat exchanging medium pressure measuring apparatus according to claim 10, wherein:

said cylindrical portion of said sensor mounting member has external diameters and dimensions in an axial direction which allow said cylindrical portion to be fitted in said small diameter portion and said large diameter portion of said communicating hole, wherein a slit extends from a side of said small diameter portion and said cylindrical portion is provided with a retaining portion to be fitted in said slit of said small diameter portion.

12. A heat exchanging medium pressure measuring apparatus according to claim 3, wherein:

said partitioning wall is constituted of an electrical insulator to electrically isolate said first pressure sensor from said second pressure sensor.

13. A heat exchanging medium pressure measuring apparatus according to claim 1, wherein:

one side of said low pressure passage of said sensor mounting block communicates with a low pressure passage of a piping joint connector and another side of said low pressure passage of said senor mounting block is constituted as an integrated part of a low pressure passage of said expansion valve.

14. A heat exchanging medium pressure measuring apparatus according to claim 13, wherein:

said partitioning wall is constituted of an electrical insulator to electrically isolate said first pressure senor from said second pressure sensor.

15. A heat exchanging medium pressure measuring apparatus according to claim 1, wherein:

said partitioning wall is constituted of an electrical insulator to electrically isolate said first pressure sensor from said second pressure sensor.

16. A heat exchanging medium pressure measuring apparatus according to claim 1, wherein:

said pressure sensors are provided at two surfaces of said partitioning wall.

* * * * *